United States Patent Office 3,743,719
Patented July 3, 1973

3,743,719
MIXTURES OF CYCLOHEXANEALKANOIC ACIDS, THEIR ESTERS AND EUGENOL AS ATTRACTANTS FOR THE JAPANESE BEETLE
Morton Beroza, Silver Spring, and Terrence P. McGovern, Bowie, Md., Paul H. Schwartz, Jr., Willingboro, N.J., and Donald W. Hamilton, Vincennes, Ind., assignors to the United States of America as represented by the Secretary of Agriculture
No Drawing. Filed Nov. 18, 1970, Ser. No. 90,793
Int. Cl. A01n 17/14
U.S. Cl. 424—84                                    10 Claims

ABSTRACT OF THE DISCLOSURE

Mixtures of methyl 3-cyclohexanepropionate, ethyl 3-cyclohexanepropionate, methyl 4-cyclohexanebutyrate, or methyl cyclohexaneacetate with eugenol are attractants for the Japanese beetle. Other attractant constituents, geraniol and phenethyl butyrate, may be added without much sacrifice of attraction.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to certain combinations of cyclohexanoic acids, there esters, and eugenol as attractants for the Japanese beetle.

The Japanese beetle, *Popillia japonica* Newman, is a serious pest that damages or destroys a large number of plants. Attractants in traps are used to delineate the areas of infestation to show where insecticide should be applied and to prevent further spread of the insect. Attractants in traps are also used to indicate the best time to apply control measures in order to minimize damage caused by the insect.

In the past a 9:1 combination of geraniol and eugenol [W. E. Fleming, E. D. Burgess, and W. W. Maines, U.S.D.A. Circular 594, 1940] and a 9:1 mixture of anethole and eugenol [W. E. Fleming and R. D. Chisholm, Journal of Economic Entomology, 37, 116, 1944] were used as Japanese beetle attractants. At present a 9:1 mixture of phenethyl butyrate and eugenol [P. H. Schwartz, D. W. Hamilton, C. W. Jaster, and B. G. Townshend, Journal of Economic Entomology, 59, 1516, 1966] is used, and it is now the standard attractant. The compositions of this invention are up to three times more effective than the standard attracant.

We have found that certain compounds having the general formula

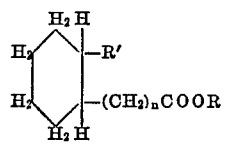

in which R is hydrogen, methyl, or ethyl, R' is hydrogen or methyl, and n is 0 to 3, are attractants for the Japanese beetle when combined in a 9:1 mixture with eugenol. Specifically, methyl 3 - cyclohexanepropionate, ethyl 3-cyclohexanepropionate, methyl 4 - cyclohexanebutyrate, and methyl cyclohexaneacetate in the mixtures with eugenol were found to be excellent attractants.

Table 1 gives typical data on attraction of Japanese beetles with these and related compounds in mixtures with eugenol. Many other related compounds and eugenol were tested, but they are not included in Table 1 because their catches were low. Changing the proportion of compound and eugenol retained attraction.

In order to test the mixtures, traps containing the various chemicals were exposed in the summer of 1967 at Dahlonega, Georgia in a hay field containing red clover in bloom and brome grass that was infested with adult Japanese beetles. The field was divided into 10 blocks each containing 20 traps on aluminum rods set about 7.3 meters apart and 1.4 meters above ground. The traps were placed in a completely random statistical design, and each candidate attractant was replicated three times both as the pure material and as a 9:1 mixture with eugenol. (None of the pure materials caught well.) The bait dispenser was a 5 cm. by 1.5 cm. diameter vial with a 3 mm. wick protruding 1.5 cm. Beetle catch was determined 5 and 10 days following placement. Results on compounds that caught well were verified by similar trials conducted in the summer of 1968 at two other locations.

In addition to the foregoing experiments, ternary combinations of the attractants that were found effective are given in Table 2. These combinations were about twice as good as the standard attractant. In these tests the 9:1 mixture of methyl 3-cyclohexanepropionate and eugenol rated 312 vs. the standard attractant.

The foregoing examples of attraction of Japanese beetles by chemical combinations are meant to be illustrative rather than limiting. For example, as is well known in the art, the proportions of the ingredients of the chemicals in the mixtures cited may be changed. Thus, preliminary evidence indicates that proportions of methyl 3-cyclohexanepropionate and eugenol less than 9:1 are more attractive than the 9:1 combination of these same chemicals. The addition of inert material, such as a parafin fraction, to depress volatilization, or other formulations of the attractant mixtures are also not considered to be departures from this invention. For example, it is well known in the art that insecticides may be mixed with the attractant chemicals and dispensed for control purposes.

TABLE 1

Relative attraction of Japanese beetles by 9:1 mixtures of a cyclohexanealkanoic acid and esters of cyclohexanealkanoic acids with eugenol vs. the standard 9:1 mixture of phenethyl butyrate and eugeonol.

| Compound (plus eugenol 9:1) | Relative attraction [a] wherein R= | | | |
|---|---|---|---|---|
| | H | $CH_3$ | $C_2H_5$ | $C_3H_7$ |
| ⟨S⟩—COOR | -------- | 18 | -------- | 70 |
| ⟨S⟩—$CH_2$COOR | -------- | 91 | 45 | 24 |
| ⟨S⟩—$(CH_2)_2$COOR | -------- | 255 | 148 | 32 |
| ⟨S⟩—$(CH_2)_3$COOR | -------- | 133 | 26 | 21 |
| $CH_3$—⟨S⟩—COOR | 62 | 21 | | 19 |

[a] Standard=100.

TABLE 2

Relative attraction of several combinations of chemicals and the standard 9:1 mixture of phenethyl butyrate and eugenol

| Chemical combination | Relative attraction [1] |
|---|---|
| 9 parts methyl 3-cyclohexane propionate plus 1 part eugenol | 312 |
| 9 parts methyl 3-cyclohexane propionate plus 9 parts geraniol plus 2 parts eugenol | 224 |
| 9 parts methyl 3-cyclohexane propionate plus 9 parts phenethyl butyrate plus 2 parts eugenol | 193 |

[1] Standard=100.

We claim:

1. An attractant for Japanese beetles consisting of a mixture of eugenol and a compound selected from the group consisting of methyl 3-cyclohexanepropionate, ethyl 3-cyclohexanepropionate, methyl 4-cyclohexanebutyrate, and methyl cyclohexaneacetate and wherein the eugenol and the compound are present in a ratio of 1:9, respectively.

2. The attractant of claim 1 wherein the compound is methyl 3-cyclohexanepropionate.

3. The attractant of claim 1 wherein the compound is ethyl 4-cyclohexanepropionate.

4. The attractant of claim 1 wherein the compound is methyl 3-cyclohexanebutyrate.

5. The attractant of claim 1 wherein the compound is methyl cyclohexaneacetate.

6. A method of attracting Japanese beetles comprising baiting a trap with an effective attractant amount of a mixture of eugenol and a compound selected from the group consisting of methyl 3-cyclohexanepropionate, ethyl 3-cyclohexanepropionate, methyl 4-cyclohexanebutyrate and methyl cyclohexaneacetate and wherein the eugenol and the compound are present in a ratio of 1:9, respectively.

7. The method of claim 6 wherein the compound is methyl 3-cyclohexanepropionate.

8. The method of claim 6 wherein the compound is ethyl 3-cyclohexanepropionate.

9. The method of claim 6 wherein the compound is methyl 4-cyclohexanebutyrate.

10. The method of claim 6 wherein the compound is methyl cyclohexaneacetate.

References Cited

UNITED STATES PATENTS 3,485,868   12/1969   Eddy et al. _____ 424—84
1,572,568   2/1926    Smith et al. _____ 424—84

OTHER REFERENCES

Shwartz et al.: J. Econ. Ent., vol. 59, No. 6 (1966), pp. 1516–1517.

ALBERT T. MEYERS, Primary Examiner

V. D. TURNER, Assistant Examiner